United States Patent
Hirschberg

(10) Patent No.: US 11,861,768 B1
(45) Date of Patent: Jan. 2, 2024

(54) ALPHA SHAPE APPROXIMATION OF DATA POINTS

(71) Applicant: Everlaw, Inc., Oakland, CA (US)

(72) Inventor: David Hirschberg, Los Angeles, CA (US)

(73) Assignee: Everlaw, Inc., Oakland, CA (US)

( * ) Notice: Subject to any disclaimer, the term of this patent is extended or adjusted under 35 U.S.C. 154(b) by 141 days.

(21) Appl. No.: 17/544,771

(22) Filed: Dec. 7, 2021

(51) Int. Cl.
*G06T 11/20* (2006.01)

(52) U.S. Cl.
CPC ........ *G06T 11/206* (2013.01); *G06T 2200/24* (2013.01)

(58) Field of Classification Search
CPC ............................. G06T 11/206; G06T 2200/24
See application file for complete search history.

(56) References Cited

U.S. PATENT DOCUMENTS

2023/0069079 A1\* 3/2023 Rao ....................... G06F 16/285

OTHER PUBLICATIONS

Edelsbrunner et al., 'On the shape of a set of points in the plane,' IEEE Transactions on information theory, vol. 29, Issue: 4, Jul. 1983.
Everlaw Support, 'Dec. 18, 2020 Release: Clustering (beta), upload PDFs without a load file, and more!,' Dec. 23, 2020 [online] [retrieved on Dec. 8, 2021] Retrieved from the Internet <URL:https://support.everlaw.com/hc/en-us/articles/360052938832-December-18-2020-Release-Cl>, 11 pgs.
Wikipedia.org, 'Alpha shape,' [online] [retrieved on Dec. 8, 2021] Retrieved from the Internet <URL:https://en.wikipedia.org/wiki/Alpha_shape>, 3 pgs.
Wikipedia.org, 'Convex hull,' [online] [retrieved on Dec. 8, 2021] Retrieved from the Internet <URL: https://en.wikipedia.org/wiki/Convex_hull>, 18 pgs.
Anonymous: Wikepedia article "Alpha shape", XP093029180; Dec. 15, 2020 3 pages.
Myhrvold Nathan P.: "Dinosaur Metabolism and the Allometry of Maximum Growth Rate", PLOS One, vol. 11, No. 11; e0163205, XP093029179, DOI: 10.1371/journal.pone.0163205Retrieved from the Internet: ORL•: https: / / journals .plos .org/plosone/article/file?id=10.1371/journal.pone.0163205&type=printable>; Nov. 9, 206; 35 pages.
PCT Application No. PCT/US22/80890; International Search Report and Written Opinion of the International Searching Authority; dated Mar. 23, 2023; 15 pages.
Smith Victoria A et al: "Basins of attraction in human balance", European Physical Journal Special Topics, Springer, DE, FR, vol. 226, No. 15, 3315-3324, XP036388974, ISSN: 1951-6355, DOI: 10.1140/EPJST/E2016-60345-4; Dec. 28, 2017; 10 pages.

\* cited by examiner

*Primary Examiner* — Michelle L Sams
(74) *Attorney, Agent, or Firm* — Banner & Witcoff, Ltd.

(57) ABSTRACT

Methods, systems, and storage media for generating a polygon representation of a plurality of data points are disclosed. Exemplary implementations can: receive a representation of data points from a data source, the representation comprising at least a two-dimensional (2D) data plot; calculate a core representation of the data points; dilate the core representation of the data points, comprising multiplying each data point by a multiple of an epsilon distance; generate dilated points based on the multiplying of each data point; generate a polygon representation of the data points based at least in part on intersections between the dilated points; and cause display of the polygon representation through a user interface.

20 Claims, 10 Drawing Sheets

400

402
Receiving a representation of data points from a data source, the representation comprising at least a two-dimensional (2D) data plot

404
Calculating a core representation of the data points

406
Dilating the core representation of the data points, comprising multiplying each data point by a multiple of an epsilon distance

408
Generating dilated points based on the multiplying of each data point

410
Generating a polygon representation of the data points based at least in part on intersections between the dilated points

412
Causing display of the polygon representation through a user interface

FIG. 4

ALPHA SHAPE APPROXIMATION OF DATA POINTS

TECHNICAL FIELD

The present disclosure generally relates to data analysis, and more particularly to generating polygon representations of data.

BACKGROUND

Data analysis is an important tool for discovering useful information in data, which aids in informing conclusions and supporting decision-making. Data analysis has multiple facets and approaches, encompassing diverse techniques under a variety of names, and includes inspecting, cleansing, transforming, and modelling data. Data analysis is used across different disciplines, such as business, science, and social science. Conventionally, data analysis plays a role in making decisions more scientific and helping businesses operate more effectively. However, conventional data analysis techniques have failed to provide adequate tools to approximate clusters of data.

BRIEF SUMMARY

The subject disclosure addresses the shortcomings described above by providing for systems and methods for generating polygon representations of data. In exemplary implementations, core data points are calculated. An epsilon distance is also calculated. The core data points are dilated by a multiple of the epsilon distance. All the dilations are combined and reduced to polygons. In accordance with illustrative embodiments of the present invention, a process utilizes denser (e.g., core) regions of the data to dilate, union, reduce, and simplify the data points into polygons to create a polygon representation of the data that is not distorted by outliers and noise.

One illustrative embodiment of the present disclosure relates to a method for generating a polygon representation of a plurality of data points. The method includes receiving a representation of data points from a data source, the representation includes at least a two-dimensional (2D) data plot. The method includes calculating a core representation of the data points. The method includes dilating the core representation of the data points, including multiplying each data point by a multiple of an epsilon distance. The method includes generating dilated points based on the multiplying of each data point. The method includes generating a polygon representation of the data points based at least in part on intersections between the dilated points. The method includes causing display of the polygon representation through a user interface.

Another illustrative embodiment of the present disclosure relates to a system configured for generating a polygon representation of a plurality of data points. The system includes one or more hardware processors configured by machine-readable instructions. The processor(s) can be configured to receive a representation of data points from a data source, the representation includes at least a two-dimensional (2D) data plot. The processor(s) can be configured to calculate a core representation of the data points. The processor(s) can be configured to dilate the core representation of the data points, including multiplying each data point by a multiple of an epsilon distance. The processor(s) can be configured to generate dilated points based on the multiplying of each data point. The processor(s) can be configured to generate a polygon representation of the data points based at least in part on intersections between the dilated points. The processor(s) can be configured to cause display of the polygon representation through a user interface.

Yet another illustrative embodiment of the present disclosure relates to a non-transient computer-readable storage medium having instructions embodied thereon, the instructions being executable by one or more processors to perform a method for generating a polygon representation of a plurality of data points. The method includes receiving a representation of data points from a data source, the representation includes at least a two-dimensional (2D) data plot. The method includes calculating a core representation of the data points. The method includes dilating the core representation of the data points, including multiplying each data point by a multiple of an epsilon distance. The method includes generating dilated points based on the multiplying of each data point. The method includes generating a polygon representation of the data points based at least in part on intersections between the dilated points. The method includes causing display of the polygon representation through a user interface.

Still another illustrative embodiment of the present disclosure relates to a system configured for generating a polygon representation of a plurality of data points. The system includes means for receiving a representation of data points from a data source, the representation includes at least a two-dimensional (2D) data plot. The system includes means for calculating a core representation of the data points. The system includes means for dilating the core representation of the data points, including multiplying each data point by a multiple of an epsilon distance. The system includes means for generating dilated points based on the multiplying of each data point. The system includes means for generating a polygon representation of the data points based at least in part on intersections between the dilated points. The system includes means for causing display of the polygon representation through a user interface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates an example flow diagram for generating a polygon representation of data points, according to certain illustrative embodiments of the disclosure.

Figure 1A:
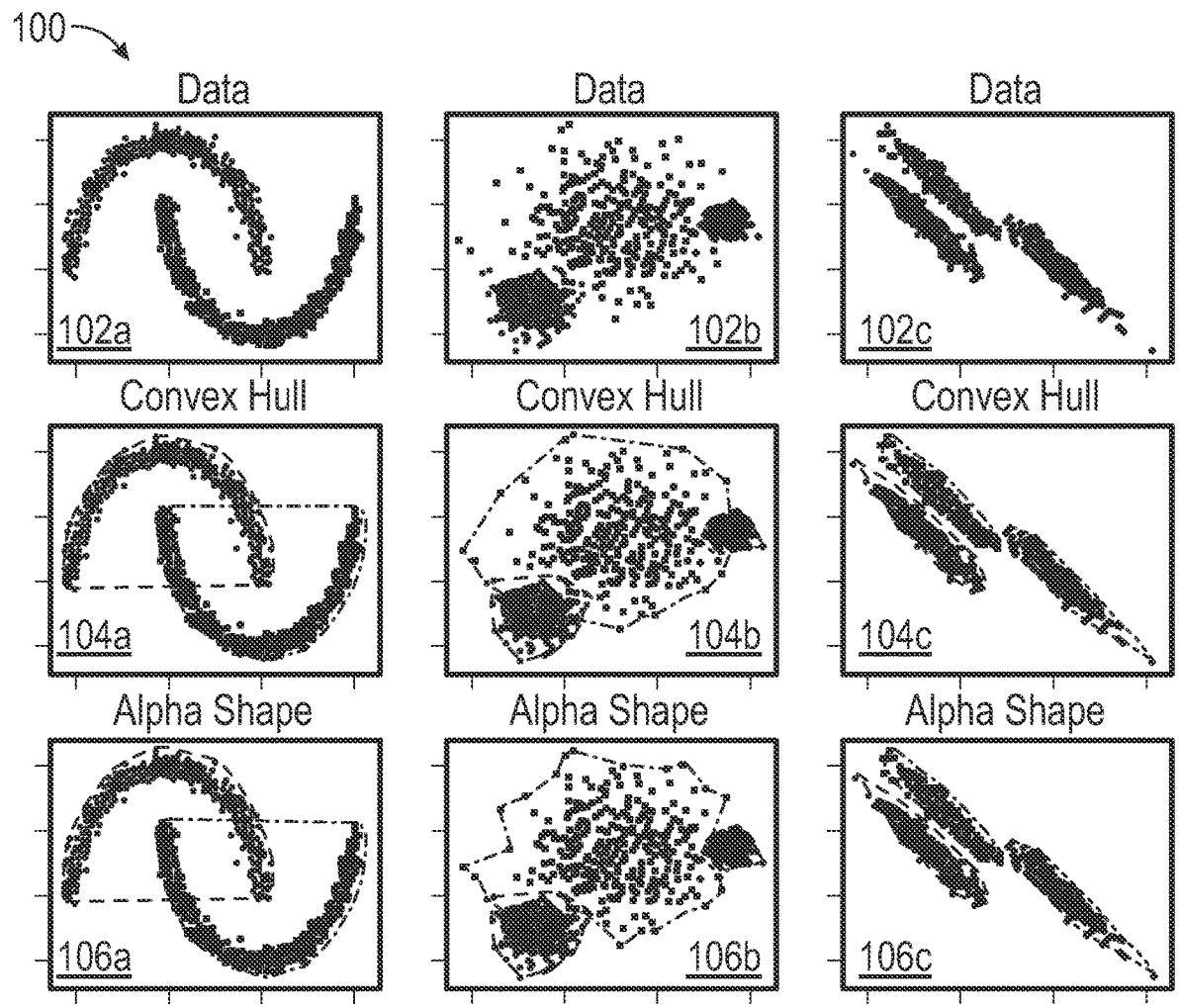
FIGS. 1A and 1B illustrate exemplary data visualization diagrams, according to certain illustrative embodiments of the present disclosure.
Figure 1A:
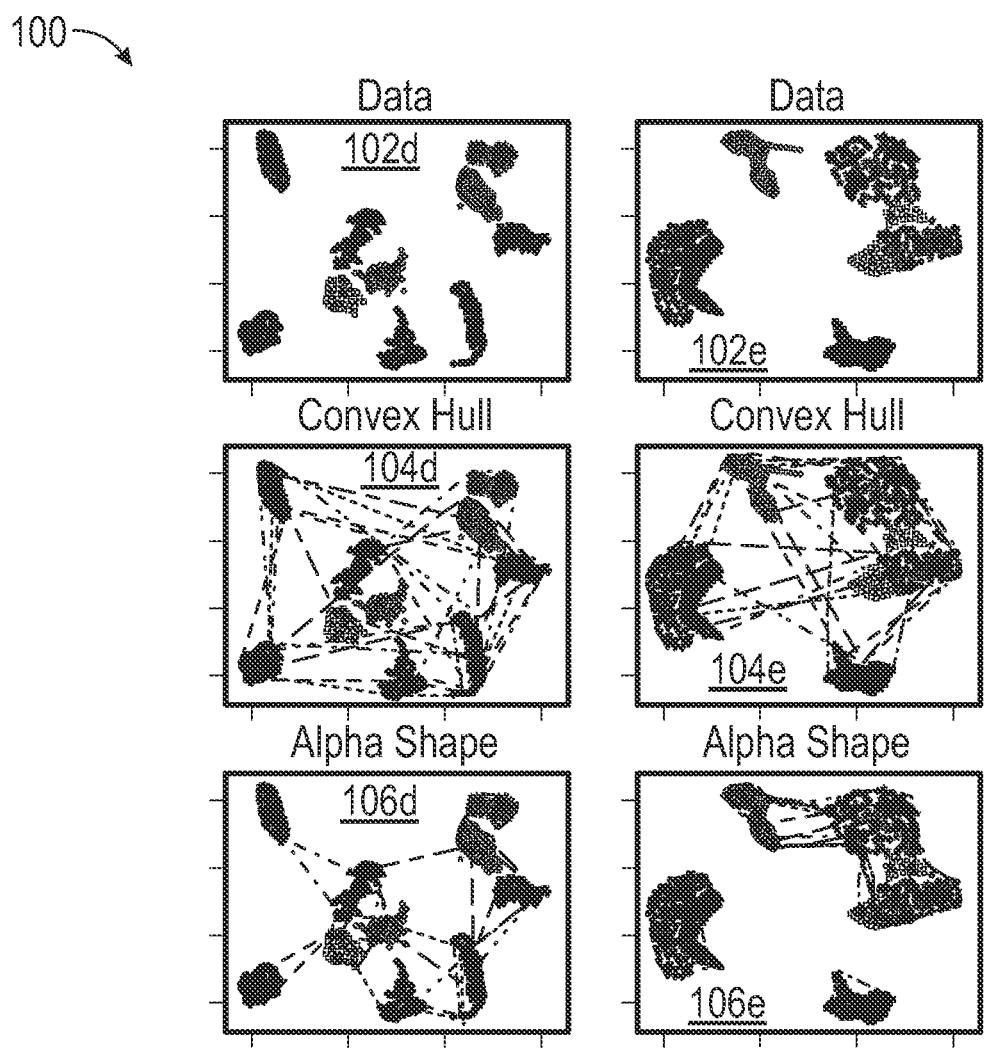

In one or more implementations, not all of the depicted components in each figure can be required, and one or more implementations can include additional components not shown in a figure. Variations in the arrangement and type of the components can be made without departing from the scope of the subject disclosure. Additional components, different components, or fewer components can be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure can be practiced without some of these specific details. In other instances, well-known structures and techniques have not been shown in detail so as not to obscure the disclosure.

The subject disclosure addresses the shortcomings of conventional data analysis techniques, which have failed to provide adequate tools for approximation of data clusters (including collections of data points, and the like), by providing for systems and methods for generating polygon representations of data.

Data analysis is an important tool for discovering useful information in data, which aids in informing conclusions and supporting decision-making. Data analysis has multiple facets and approaches, encompassing diverse techniques under a variety of names, and includes inspecting, cleansing, transforming, and modelling data. Data analysis is used across different disciplines, such as business, science, and social science. Conventionally, data analysis plays a role in making decisions more scientific and helping businesses operate more effectively.

Data analysis can also leverage the power of data visualization to produce effective results. Data visualization includes mappings between the original data (e.g., numerical data) and graphic elements (e.g., lines or points in a chart). The mapping determines how the attributes of these elements vary according to the data. For example, a bar chart can map a length of a bar to a magnitude of a variable. Additionally, data visualization is an efficient way of communicating data significance when the data is numerous.

In computational geometry, an alpha shape (e.g., α-shape) is a family of piecewise linear simple curves in the Euclidean plane associated with the shape of a finite set of points. According to illustrative embodiments, an alpha shape associated with a set of points includes a convex hull. For example, the convex hull of a shape can include the smallest convex set that contains it. The convex hull can be defined either as the intersection of all convex sets containing a given subset of a Euclidean space, or equivalently as the set of all convex combinations of points in the subset. For a bounded subset of the plane, the convex hull can be visualized as the shape enclosed by a rubber band stretched around the subset. Alpha shapes and convex hulls can be utilized to generate polygon representations of data sets, however, conventionally neither are very robust against noise and/or outliers. Therefore, there is a need for better alternatives to alpha shapes (and the like) for visualizing data.

The subject disclosure provides for systems and methods for generating polygon representations of data. In exemplary implementations, core data points are calculated. An epsilon distance is also calculated. The core data points can be dilated by a multiple of the epsilon distance. All the dilations can be combined and reduced to polygons. According to illustrative embodiments, a process utilizes denser (e.g., core) regions of the data to dilate, union, reduce, and simplify the data points into polygons to create a polygon representation of the data that is not distorted by outliers and noise.

According to illustrative embodiments, a method for generating a polygon representation of a plurality of data points includes receiving a representation of data points from a data source. For example, the representation can include at least a two-dimensional (2D) data plot. The method can also include calculating a core representation of the data points. The method can also include dilating the core representation of the data points by multiplying each data point by a multiple of an epsilon distance. The method can also include generating dilated points based on the multiplying of each data point. The method can also include generating a polygon representation of the data points based at least in part on intersections between the dilated points. The method can also include causing display of the polygon representation through a user interface.

The disclosed system(s) address a problem in traditional data analysis techniques tied to computer technology, namely, the technical problem of visualizing data. The disclosed system solves this technical problem by providing a solution also rooted in computer technology, namely, by providing for generating polygon representations of data. The disclosed subject technology further provides improvements to the functioning of the computer itself because it improves processing of the data, and also improves efficiency in grouping and analyzing the data.

Figure 1B:
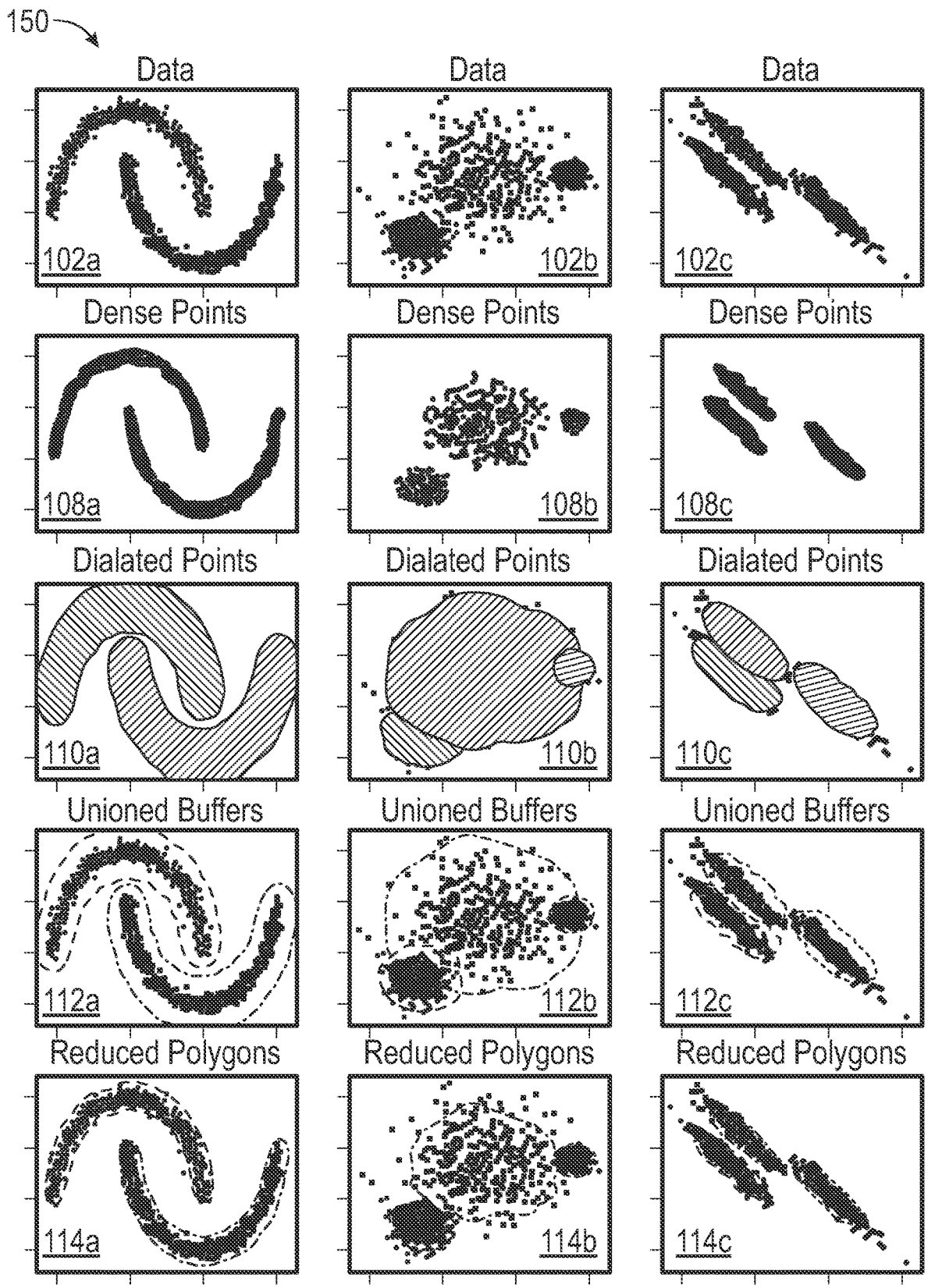
Figure 1B:
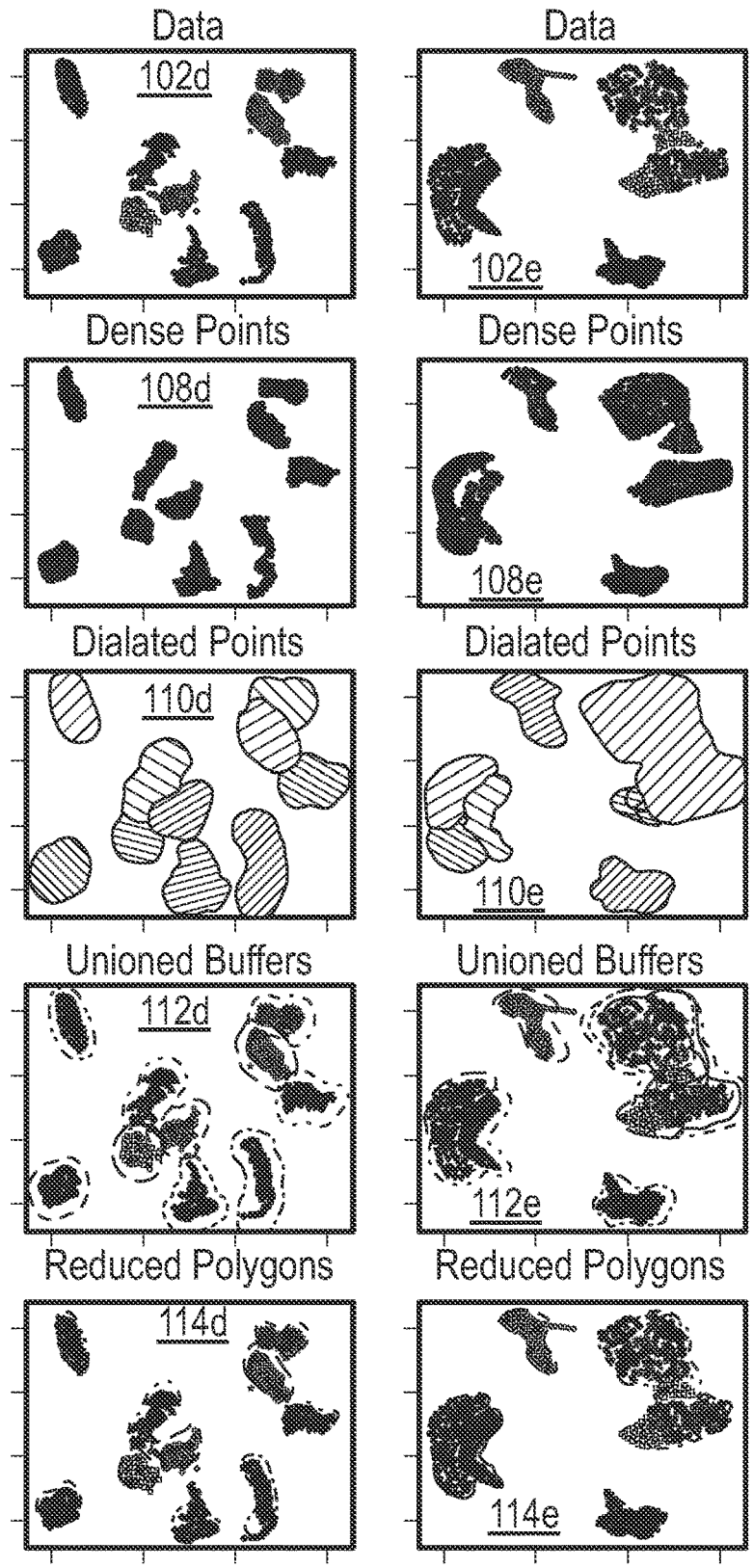
Figure 1B:
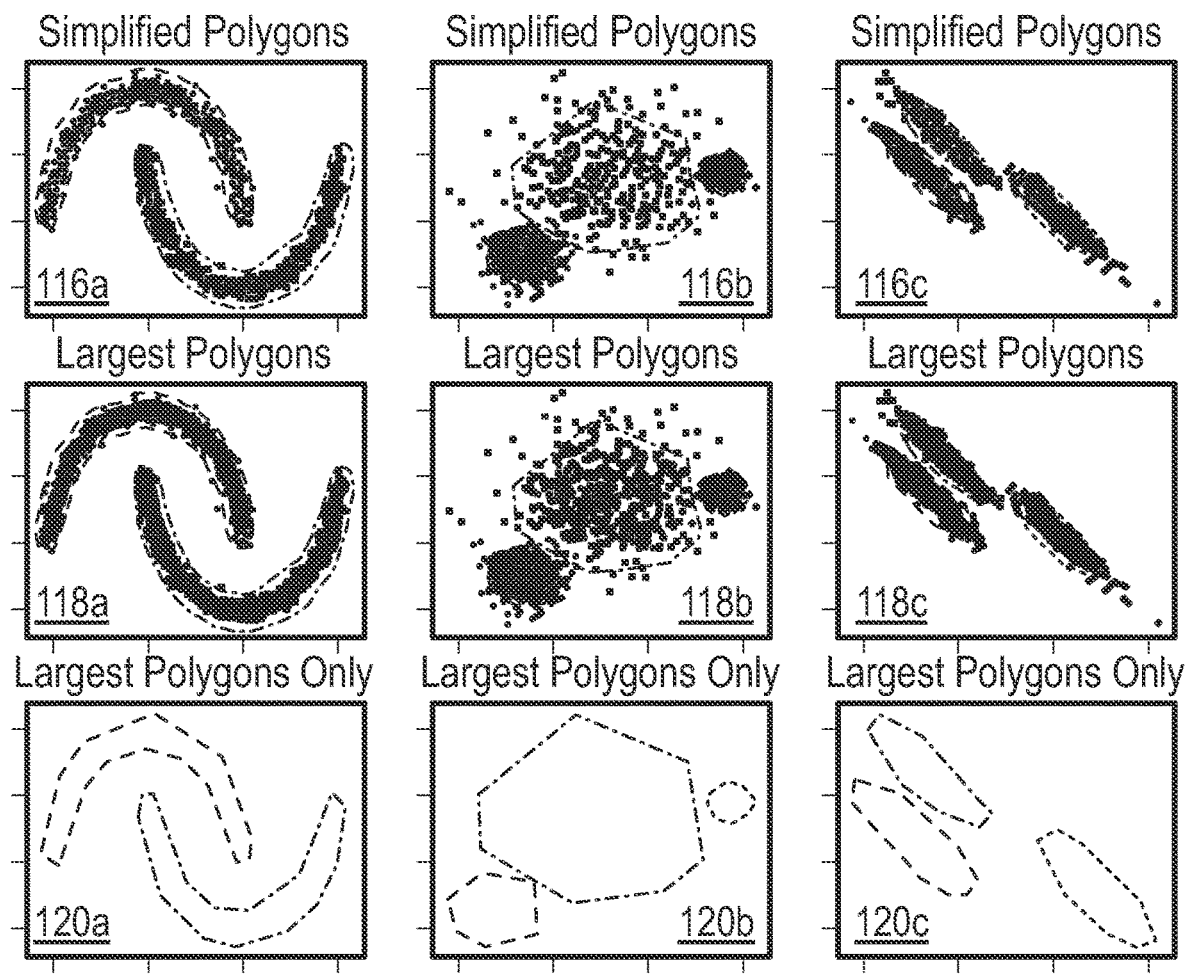
Figure 1B:
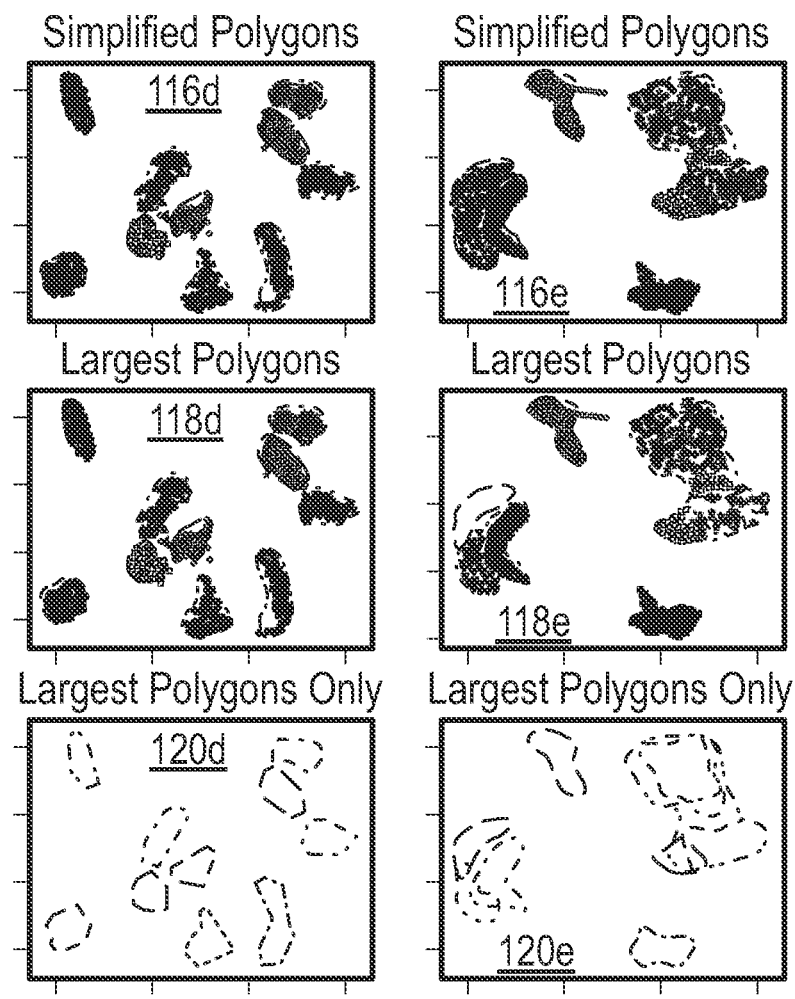

FIGS. 1A and 1B illustrate exemplary data visualization diagrams 100 and 150 that are generated from data 102, according to certain illustrative embodiments of the present disclosure. Referring now to FIG. 1A, exemplary visualization diagrams 100 includes diagrams for data 102, convex hulls 104, and alpha shapes 106. For example, data diagrams 102a-102e can illustrate different distributions of data. In an implementation, the data 102a-102e can be from a data source, including, but not limited to, cloud storage, servers, hard drives, etc.

According to illustrative embodiments, convex hulls 104 can be generated as lines around the data 102. As illustrated, convex hulls 104d and 104e are much more complex than convex hulls 104a, 104b, and 104c. According to illustrative embodiments, alpha shapes 106 can be generated based on outlines that more closely follow the data 102 than for the convex hulls 104. However, alpha shapes 106d and 106e are more complex than alpha shapes 106a, 106b, and 106c.

Referring now to FIG. 1B, exemplary visualization diagrams 150 includes diagrams for the data 102, dense points 108 (e.g., core points), and dilated points 110, combined (e.g., unioned) buffers 112, reduced polygons 114, simplified polygons 116, largest polygons 118, and isolated largest polygons 120 (e.g., polygons only).

According to illustrative embodiments, core points 108a-108e can be generated based on a density of points. Similarly, the dilated points 110a-110e can be generated based on a dilation of points.

The combined buffers 112 can also generate enclosures (e.g., combined buffers) that are too large for the data 102, such as in 112a, 112b, and 112d. The reduced polygons 114a-114e also do not adequately capture outliers, such as in 114b and 114c. The simplified polygons 116a-116e and the largest polygons 118a-118e also do not adequately capture outliers.

According to illustrative embodiments, the isolated largest polygons 120a-120e illustrate a simplified visual representation of the data 102*a*-102*e*. However, the data points themselves are not adequately illustrated by the isolated largest polygons 120*a*-120*e*.

Figure 2:
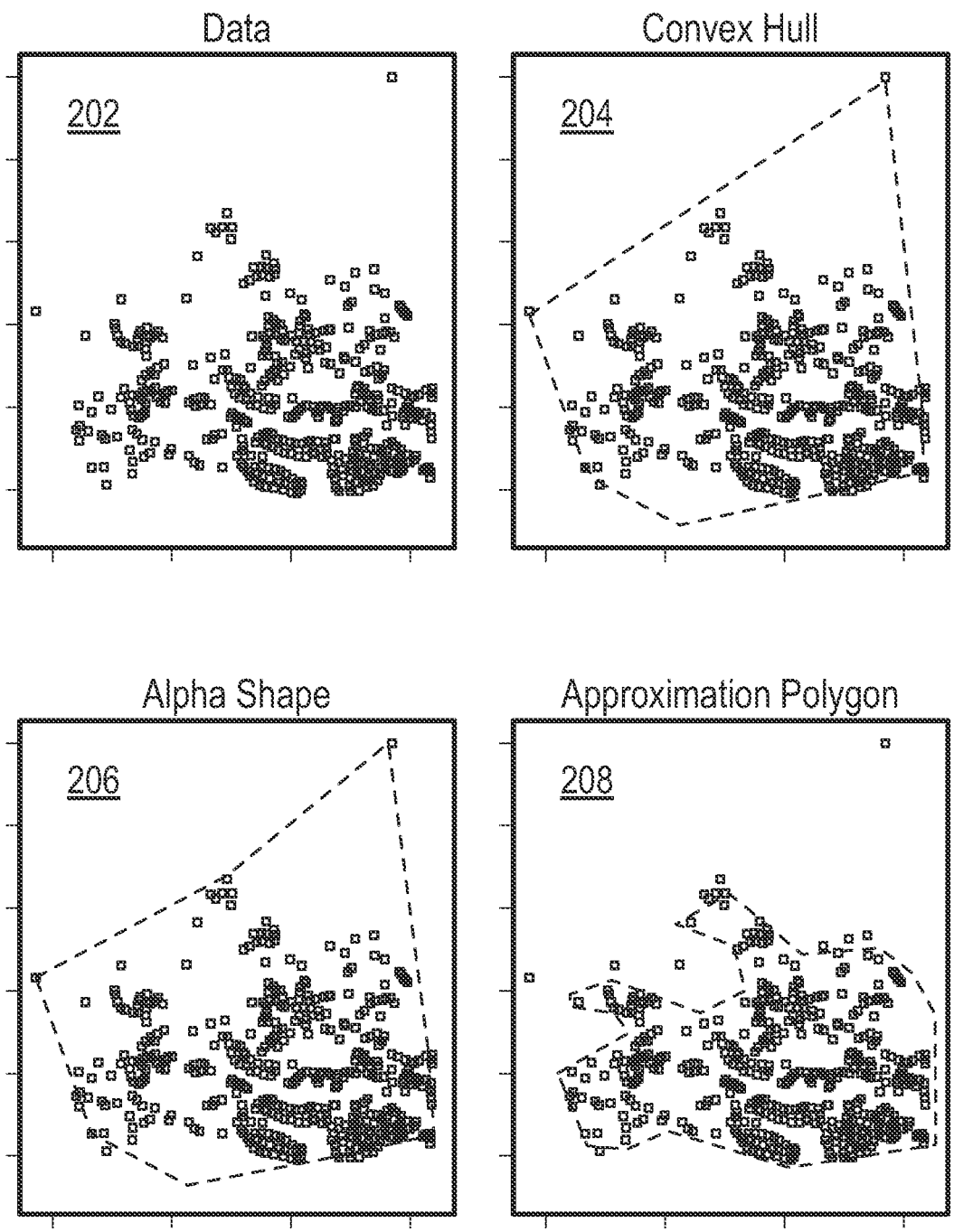
FIG. 2 illustrates exemplary approximation polygon generation, according to certain illustrative embodiments of the present disclosure.

FIG. 2 illustrates exemplary approximation polygon generation 200, according to certain illustrative embodiments of the present disclosure. For example, data 202 can be received and displayed in a data plot. The data plot includes at least a two-dimensional (2D) representation of data.

According to illustrative embodiments, a convex hull 204 can be generated for the data 202. For example, a single curve can be drawn around the data plot that best includes all of the data 202. Next, an alpha shape 206 can be generated that further improves on the accuracy of the convex hull 204. Finally, an approximation polygon 208 can be generated that most closely includes the data 202 while also reducing outliers. The approximation polygon 208 can then be utilized to generate interactive data visualizations for the data 202.

According to illustrative embodiments, core data points can be calculated for the data 202. For example, kernel density estimation can be utilized to calculate a probability distribution function. In an implementation, a Hierarchical Density-Based Spatial Clustering of Applications with Noise (HDBSCAN) can also be utilized. It is understood that other outlier detection algorithms can be utilized without departing from the scope of the disclosure.

According to illustrative embodiments, an epsilon distance can be calculated. For example, a k-nearest neighbors algorithm (k-NN) can be utilized to determine a $k^{th}$ neighbor's distance, and the epsilon distance includes an average of the $k^{th}$ neighbors distances. The epsilon distance can be utilized to determine at what density and scale the data exists.

According to illustrative embodiments, core points can be calculated by multiplying each data point by a multiple (M) of the epsilon distance (epsilon). In an implementation, the core points can be dilated by multiplying a radius of each core point by a scaling factor, wherein the scaling factor is a number greater than one. After dilating the data points, each point becomes a circle of radius epsilon*M.

According to illustrative embodiments, all of the dilated points are unioned together, and the dilations that intersect become dilation polygons. If for some reason a dilation has no intersection, then it will remain a circle.

According to illustrative embodiments, the dilation polygons can be reduced. For example, the dilation polygons can each be reduced by a factor of epsilon*(M−1). The dilation polygons can then be simplified. For example, each polygon can be simplified such that all points within the polygon are within an epsilon distance of the polygon.

Figure 3:
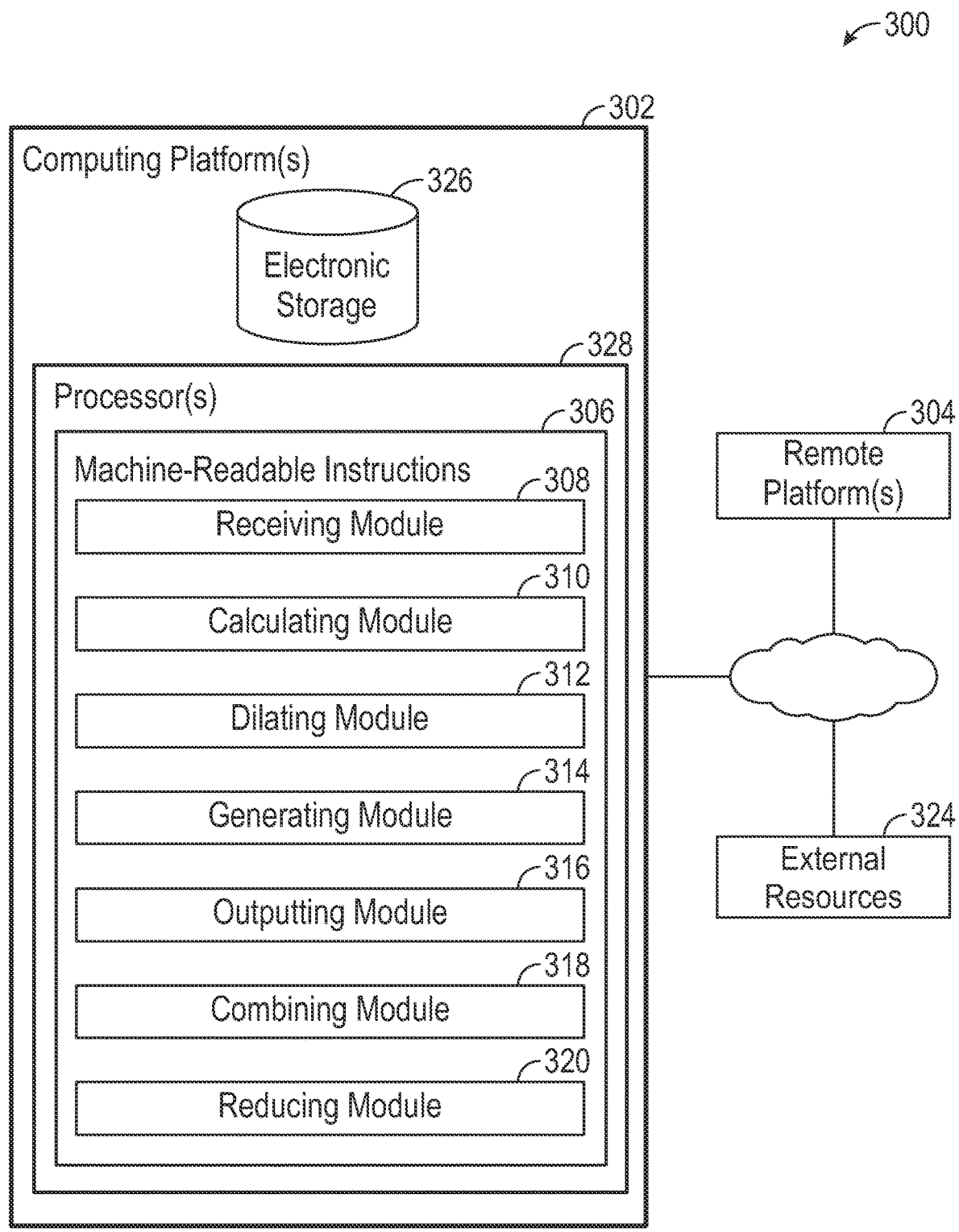
FIG. 3 illustrates a system configured for generating a polygon representation of data points, according to certain illustrative embodiments of the disclosure.

FIG. 3 illustrates a system 300 configured for generating a polygon representation of data points, in accordance with one or more implementations. In some implementations, system 300 includes one or more computing platforms 302. Computing platform(s) 302 can be configured to communicate with one or more remote platforms 304 according to a client/server architecture, a peer-to-peer architecture, and/or other architectures. Remote platform(s) 304 can be configured to communicate with other remote platforms via computing platform(s) 302 and/or according to a client/server architecture, a peer-to-peer architecture, and/or other architectures. Users can access system 300 via remote platform(s) 304.

Computing platform(s) 302 can be configured by machine-readable instructions 306. Machine-readable instructions 306 includes one or more instruction modules. The instruction modules includes computer program modules. The instruction modules include one or more of receiving module 308, calculating module 310, dilating module 312, generating module 314, outputting module 316, combining module 318, and/or reducing module 320, and/or other instruction modules.

Receiving module 308 can be configured to receive a representation of data points from a data source. For example, the representation can include at least a two-dimensional (2D) data plot.

Calculating module 310 can be configured to calculate a core representation (e.g., a core representation includes core points) of the data points. Calculating module 310 can also be configured to calculate a kernel density estimation. According to illustrative embodiments, a Hierarchical Density-Based Spatial Clustering of Applications with Noise (HDBSCAN) can also be utilized. It is understood that other outlier detection algorithms/approaches can be utilized without departing from the scope of the disclosure.

Calculating module 310 can also be configured to calculate the epsilon distance. According to illustrative embodiments, calculating the epsilon distance includes utilizing a k-nearest neighbors algorithm (k-NN).

Dilating module 312 can be configured to dilate the core representation of the data points. For example, each data point can be multiplied by a multiple of the epsilon distance.

Generating module 314 can be configured to generate dilated points based on the multiplying of each data point. Generating module 314 can also be configured to generate a polygon representation of the data points based at least in part on intersections between the dilated points.

Outputting module 316 can be configured to cause output (e.g., display) of the polygon representation through a user interface.

Combining module 318 can be configured to take a union of all the dilated points, such that intersections between the dilated points includes polygons.

Reducing module 320 can be configured to reduce the polygon representation by a factor of the epsilon distance.

According to illustrative embodiments, the data points are grouped together. For example, the data points can be grouped together based on at least one of classifications, clusters, labels, a same subset of characteristics among a set of characteristics, etc. It is understood that the data can be grouped together in other ways, and is not limited to the above.

According to illustrative embodiments, the epsilon distance includes an average of the k-NN.

According to illustrative embodiments, each dilated point includes a circle having a radius that is a multiple of the epsilon distance. According to illustrative embodiments, dilated points without intersections are circles.

According to illustrative embodiments, the reducing simplifies the polygon representation such that all points within the polygon representation are within the epsilon distance from each other and/or the polygon.

According to illustrative embodiments, an epsilon distance can be calculated. For example, a k-nearest neighbors algorithm (k-NN) can be utilized to determine a $k^{th}$ neighbor's distance, and the epsilon distance includes an average of the $k^{th}$ neighbors distances.

According to illustrative embodiments, core points can be calculated by multiplying each data point by a multiple (M) of the epsilon distance (epsilon). After dilating the data points, each point becomes a circle of radius epsilon*M.

According to illustrative embodiments, all of the dilated points are unioned together, and the dilations that intersect become dilation polygons. If for some reason a dilation has no intersection, then it will remain a circle.

According to illustrative embodiments, the dilation polygons can be reduced. For example, the dilation polygons can each be reduced by a factor of epsilon*(M−1). The dilation polygons can then be simplified. For example, each polygon can be simplified such that all points within the polygon are within an epsilon distance of the polygon.

In some implementations, computing platform(s) 302, remote platform(s) 304, and/or external resources 324 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 can be operatively linked via some other communication media.

A given remote platform 304 includes one or more processors configured to execute computer program modules. The computer program modules can be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 includes one or more of a server, a desktop computer, a laptop computer, a handheld computer, a tablet computing platform, a NetBook, a Smartphone, a gaming console, and/or other computing platforms.

External resources 324 includes sources of information outside of system 300, external entities participating with system 300, and/or other resources. In some implementations, some or all of the functionality attributed herein to external resources 324 can be provided by resources included in system 300.

Computing platform(s) 302 include(s) electronic storage 326, one or more processors 328, and/or other components. Computing platform(s) 302 include(s) communication lines, or ports to enable the exchange of information with a network and/or other computing platforms. Illustration of computing platform(s) 302 in FIG. 3 is not intended to be limiting. Computing platform(s) 302 include(s) a plurality of hardware, software, and/or firmware components operating together to provide the functionality attributed herein to computing platform(s) 302. For example, computing platform(s) 302 can be implemented by a cloud of computing platforms operating together as computing platform(s) 302.

Electronic storage 326 can include non-transitory storage media that electronically stores information. The electronic storage media of electronic storage 326 includes one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 includes one or more virtual storage resources (e.g., cloud storage, a virtual private network, and/or other virtual storage resources). Electronic storage 326 can store software algorithms, information determined by processor(s) 328, information received from computing platform(s) 302, information received from remote platform(s) 304, and/or other information that enables computing platform(s) 302 to function as described herein.

Processor(s) 328 can be configured to provide information processing capabilities in computing platform(s) 302. As such, processor(s) 328 includes one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 includes a plurality of processing units. These processing units can be physically located within the same device, or processor(s) 328 can represent processing functionality of a plurality of devices operating in coordination. Processor(s) 328 can be configured to execute modules 308, 310, 312, 314, 316, 318, and/or 320, and/or other modules. Processor(s) 328 can be configured to execute modules 308, 310, 312, 314, 316, 318, and/or 320, and/or other modules by software, hardware, firmware, some combination of software, hardware, and/or firmware, and/or other mechanisms for configuring processing capabilities on processor(s) 328. As used herein, the term "module" can refer to any component or set of components that perform the functionality attributed to the module. This includes one or more physical processors during execution of processor readable instructions, the processor readable instructions, circuitry, hardware, storage media, or any other components.

It should be appreciated that although modules 308, 310, 312, 314, 316, 318, and/or 320 are illustrated in FIG. 3 as being implemented within a single processing unit, in implementations in which processor(s) 328 includes multiple processing units, one or more of modules 308, 310, 312, 314, 316, 318, and/or 320 can be implemented remotely from the other modules. The description of the functionality provided by the different modules 308, 310, 312, 314, 316, 318, and/or 320 described below is for illustrative purposes, and is not intended to be limiting, as any of modules 308, 310, 312, 314, 316, 318, and/or 320 can provide more or less functionality than is described. For example, one or more of modules 308, 310, 312, 314, 316, 318, and/or 320 can be eliminated, and some or all of its functionality can be provided by other ones of modules 308, 310, 312, 314, 316, 318, and/or 320. As another example, processor(s) 328 can be configured to execute one or more additional modules that can perform some or all of the functionality attributed below to one of modules 308, 310, 312, 314, 316, 318, and/or 320.

The techniques described herein can be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 4 illustrates an example flow diagram (e.g., logic 400) for generating a polygon representation of a plurality of data points, according to certain illustrative embodiments of the disclosure. For explanatory purposes, the example logic 400 is described herein with reference to FIGS. 1-3. Further for explanatory purposes, the steps of the example logic 400 is described herein as occurring in serial, or linearly. However, multiple instances of the example logic 400 can occur in parallel. For purposes of explanation of the subject technology, the logic 400 will be discussed in reference to FIGS. 1-3.

As used herein, "logic" refers to (i) logic implemented as computer instructions and/or data within one or more computer processes and/or (ii) logic implemented in electronic circuitry.

At step 402, the logic 400 includes receiving a representation of data points from a data source. For example, the representation includes at least a two-dimensional (2D) data plot. The data source can include but is not limited to, cloud storage, servers, hard drives, etc.

At step 404, the logic 400 includes calculating a core representation of the data points is. For example, the core representation can group core points together.

At step 406, the logic 400 includes dilating the core representation of the data points. For example, the dilating can include multiplying each data point by a multiple of an epsilon distance. In this way each point can be dilated.

At step 408, the logic 400 includes generating dilated points based on the multiplying of each data point by the epsilon distance.

At step 410, the logic 400 includes generating a polygon representation of the data points based at least in part on intersections between the dilated points.

At step 412, the logic 400 includes causing the polygon representation to be displayed through a user interface. For example, the polygon representation can include a continuous curve that minimizes outliers.

For example, as described above in relation to FIGS. 1-3, at step 402, a representation of data points (e.g., data 102 and 202) from a data source is received. For example, the representation includes at least a two-dimensional (2D) data plot (e.g., 100, 150, and 200). The data source includes but is not limited to, cloud storage, servers, hard drives, etc. At step 404, a core representation (e.g., 108) of the data points is calculated. For example, the core representation can group core points together. At step 406, the core representation of the data points is dilated (e.g., via dilating module 312). For example, the dilating can include multiplying each data point by a multiple of an epsilon distance. In this way each point can be dilated. At step 408, dilated points can be generated based on the multiplying of each data point by the epsilon distance. At step 410, a polygon representation (e.g., 208) of the data points can be generated based at least in part on intersections between the dilated points. At step 412, the polygon representation is caused to be displayed through a user interface (e.g., via outputting module 316). For example, the polygon representation can include a singular polygon representation (e.g., a continuous curve) that minimizes the number of outliers that are within the polygon's enclosure.

According to an illustrative embodiment, the data points can be grouped together based on at least one of classifications, clusters, labels, and/or the like.

According to an illustrative embodiment, multiplying each data point by the multiple of the epsilon distance further includes generating a circle of radius R that is centered at a given data point P, wherein R is a distance value. For example, given a data point P and a distance R value, a circle of radius R that is centered at point P can be generated/created. According to an illustrative embodiment, R is a multiple of the epsilon value.

According to an illustrative embodiment, calculating the core representation can further include calculating a kernel density estimation or utilizing a Hierarchical Density-Based Spatial Clustering of Applications with Noise (HDBSCAN).

It is understood that other outlier detection algorithms can be utilized without departing from the scope of the disclosure.

According to an illustrative embodiment, the logic 400 further includes calculating the epsilon distance. According to an illustrative embodiment, dilated points without intersections can be circles.

According to an illustrative embodiment, calculating the epsilon distance includes utilizing a k-nearest neighbors algorithm (k-NN). According to an illustrative embodiment, the epsilon distance includes an average of the k-NN. According to an illustrative embodiment, each dilated point includes a circle having a radius that is a multiple of the epsilon distance.

According to an illustrative embodiment, the logic 400 further includes taking a union of all the dilated points. For example, the union can be taken such that intersections between the dilated points include polygons.

According to an illustrative embodiment, the logic 400 further includes reducing the polygon representation by a factor of the epsilon distance.

According to an illustrative embodiment, the reducing simplifies the polygon representation such that all points within the polygon representation are within the epsilon distance from each other and/or the polygon.

According to illustrative embodiments, an epsilon distance can be calculated. For example, a k-nearest neighbors algorithm (k-NN) can be utilized to determine a $k^{th}$ neighbor's distance. According to illustrative embodiments, the epsilon distance includes an average of the $k^{th}$ neighbors distances.

According to illustrative embodiments, core points can be calculated by multiplying each data point by a multiple (M) of the epsilon distance (epsilon). After dilating the data points, each point becomes a circle of radius epsilon*M.

According to illustrative embodiments, all of the dilated points are combined together, and the dilations that intersect become dilation polygons. If for some reason a dilation has no intersection, then it will remain a circle.

According to illustrative embodiments, the dilation polygons can be reduced. For example, the dilation polygons can each be reduced by a factor of epsilon*(M−1). The dilation polygons can then be simplified. For example, each polygon can be simplified such that all points within the polygon are within an epsilon distance of the polygon.

Figure 5:
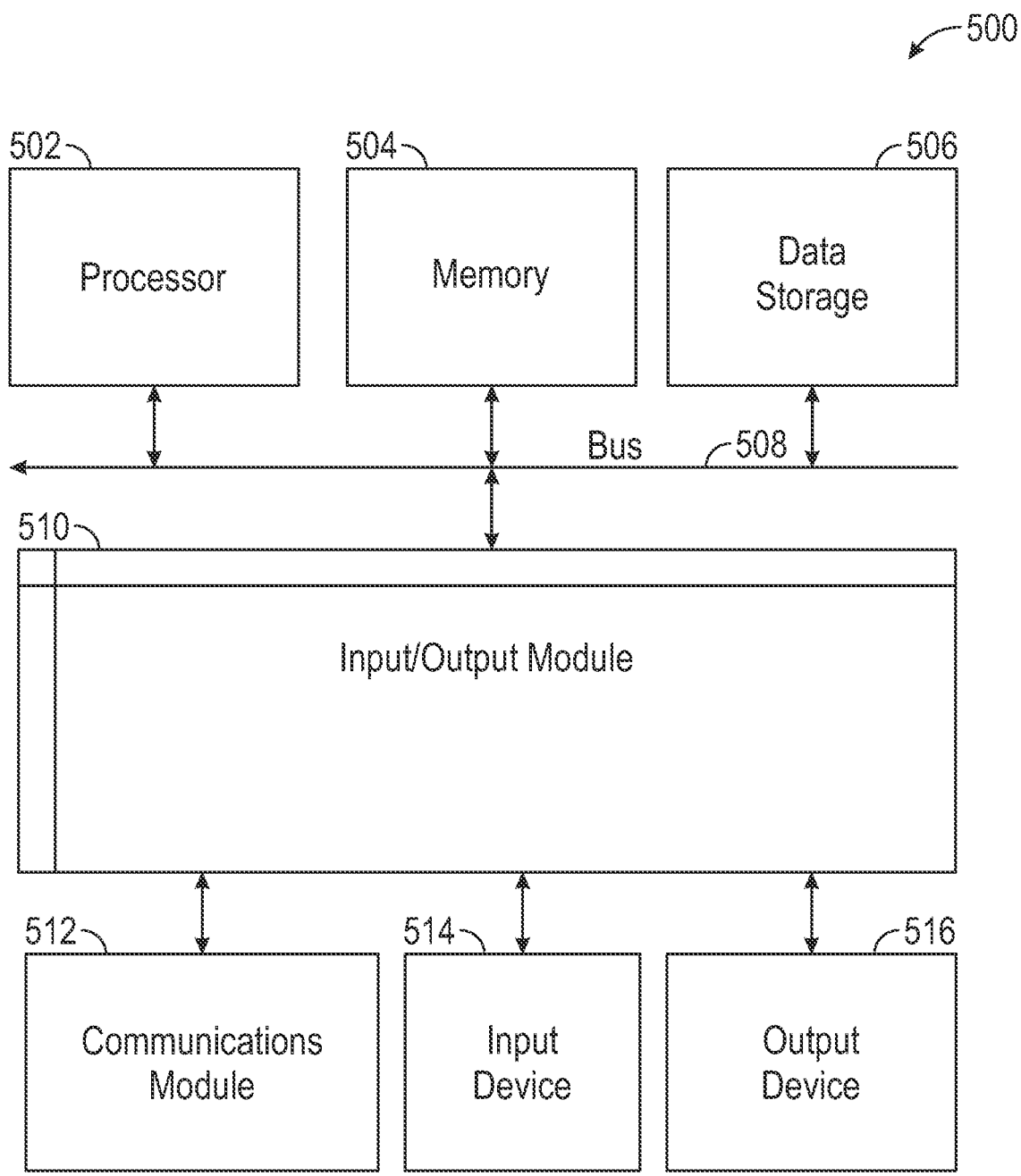
FIG. 5 is a block diagram illustrating an example computer system (e.g., representing both client and server) with which illustrative embodiments of the subject technology can be implemented.

FIG. 5 is a block diagram illustrating an exemplary computer system 500 with which illustrative embodiments of the subject technology can be implemented. In certain illustrative embodiments, the computer system 500 can be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 can be implemented with one or more processors 502. Processor 502 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions can be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions can also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 can also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 can be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain illustrative embodiments, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one illustrative embodiment of the present disclosure, the above-described gaming systems can be implemented using a computer system 500 in response to processor 502 executing one or more sequences of one or more instructions contained in memory 504. Such instructions can be read into memory 504 from another machine-readable medium, such as data storage device 506. Execution of the sequences of instructions contained in the main memory 504 causes processor 502 to perform the process steps described herein. One or more processors in a multi-processing arrangement can also be employed to execute the sequences of instructions contained in memory 504. In alternative illustrative embodiments, hard-wired circuitry can be used in place of or in combination with software instructions to implement various illustrative embodiments of the present disclosure. Thus, illustrative embodiments of the present disclosure are not limited to any specific combination of hardware circuitry and software.

Various illustrative embodiments of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video console, and/or a television set top box.

The term "machine-readable storage medium" or "computer-readable medium" as used herein refers to any medium or media that participates in providing instructions to processor 502 for execution. Such a medium can take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads data and provides a result, information can be read from the data and stored in a memory device, such as the memory 504. Additionally, data from the memory 504 servers accessed via a network, the bus 508, or the data storage 506 can be read and loaded into the memory 504. Although data is described as being found in the memory 504, it will be understood that data does not have to be stored in the memory 504 and can be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The phrase "illustrative embodiment" is used herein to mean "serving as an example, instance, or illustration." Any embodiment described herein as an "illustrative embodiment" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what can be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The subject matter of this specification has been described in terms of particular illustrative embodiments, but other illustrative embodiments can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multi-tasking and parallel processing can be advantageous. Moreover, the separation of various system components in the illustrative embodiments described above should not be understood as requiring such separation in all illustrative embodiments, and it should be understood that the described program components and systems can generally be integrated together in a single software product or packaged into multiple software products. Other variations are within the scope of the following claims.

What is claimed is:

1. A computer-implemented method for generating a polygon representation of a plurality of data points, comprising:
   receiving a representation of data points from a data source, the representation comprising at least a two-dimensional (2D) data plot;
   calculating a core representation of the data points;
   dilating the core representation of the data points, comprising multiplying each data point by a multiple of an epsilon distance;
   generating dilated points based on the multiplying of each data point; generating a polygon representation of the data points based at least in part on intersections between the dilated points; and causing display of the polygon representation through a user interface.

2. The computer-implemented method of claim 1, wherein the data points are grouped together.

3. The computer-implemented method of claim 1, wherein multiplying each data point by the multiple of the epsilon distance comprises:
   generating a circle of radius R that is centered at a given data point P, wherein R is a distance value.

4. The computer-implemented method of claim 1, further comprising:
   Calculating the epsilon distance.

5. The computer-implemented method of claim 4, wherein calculating the epsilon distance comprises utilizing a k-nearest neighbors algorithm (k-NN).

6. The computer-implemented method of claim 5, wherein the epsilon distance comprises an average of the k-NN.

7. The computer-implemented method of claim 1, wherein each dilated point comprises a circle having a radius that is a multiple of the epsilon distance.

8. The computer-implemented method of claim 1, further comprising:
   taking a union of all the dilated points, such that intersections between the dilated points comprise polygons.

9. The computer-implemented method of claim 1, further comprising:
   reducing the polygon representation by a factor of the epsilon distance.

10. The computer-implemented method of claim 9, wherein the reducing simplifies the polygon representation such that all points within the polygon representation are within the epsilon distance from each other.

11. A system configured for generating a polygon representation of a plurality of data points, the system comprising:
   one or more hardware processors configured by machine-readable instructions to:
      receive a representation of data points from a data source, the representation comprising at least a two-dimensional (2D) data plot;
      calculate a core representation of the data points;
      dilate the core representation of the data points, comprising multiplying each data point by a multiple of an epsilon distance;
      generate dilated points based on the multiplying of each data point; generate a polygon representation of the data points based at least in part on intersections between the dilated points; and
      cause display of the polygon representation through a user interface.

12. The system of claim 11, wherein the data points are grouped together.

13. The system of claim 11, wherein multiplying each data point by the multiple of the epsilon distance comprises:
   generating a circle of radius R that is centered at a given data point P, wherein R is a distance value.

14. The system of claim 11, wherein the one or more hardware processors are further configured by machine-readable instructions to:
   calculate the epsilon distance.

15. The system of claim 11, wherein each dilated point comprises a circle having a radius that is a multiple of the epsilon distance.

16. The system of claim 11, wherein the one or more hardware processors are further configured by machine-readable instructions to:
   take a union of all the dilated points, such that intersections between the dilated points comprise polygons.

17. The system of claim 11, wherein the one or more hardware processors are further configured by machine-readable instructions to:
   reduce the polygon representation by a factor of the epsilon distance.

18. A non-transient computer-readable storage medium having instructions embodied thereon, the instructions being executable by one or more processors to perform a method for generating a polygon representation of a plurality of data points, the method comprising:
   receiving a representation of data points from a data source, the representation comprising at least a two-dimensional (2D) data plot;
   calculating a core representation of the data points;
   dilating the core representation of the data points, comprising multiplying each data point by a multiple of an epsilon distance;
   generating dilated points based on the multiplying of each data point;
   generating a polygon representation of the data points based at least in part on intersections between the dilated points; and
   causing display of the polygon representation through a user interface.

19. The non-transient computer-readable storage medium of claim 18, further configured for:
   calculating the epsilon distance.

20. The non-transient computer-readable storage medium of claim 19, wherein calculating the epsilon distance comprises utilizing a k-nearest neighbors algorithm (k-NN).

* * * * *